(12) United States Patent
Arnold (10) Patent No.: US 6,273,680 B1
(45) Date of Patent: Aug. 14, 2001

(54) EXTRACTION OF ENERGY FROM FLOWING FLUIDS

(76) Inventor: Lee Arnold, 170 E. 77th St., New York, NY (US) 10021

( * ) Notice: Subject to any disclaimer, the term of this patent is extended or adjusted under 35 U.S.C. 154(b) by 0 days.

(21) Appl. No.: 09/254,955

(22) PCT Filed: Sep. 19, 1997

(86) PCT No.: PCT/US97/16955

§ 371 Date: Mar. 22, 1999

§ 102(e) Date: Mar. 22, 1999

(87) PCT Pub. No.: WO98/12433

PCT Pub. Date: Mar. 26, 1998

Related U.S. Application Data (60) Provisional application No. 60/026,981, filed on Sep. 20, 1996.

(51) Int. Cl.$^7$ ............................................. F03D 5/06
(52) U.S. Cl. ........................ 416/1; 416/64; 416/79; 416/83; 416/66; 416/68; 416/81; 416/82
(58) Field of Search ............................. 416/1, 64, 66–68, 416/79–83, DIG. 4; 60/505; 290/53, 54, 55

(56) References Cited

U.S. PATENT DOCUMENTS

| | | | | |
|---|---|---|---|---|
| 2,783,022 | * | 2/1957 | Salzer | 60/505 |
| 3,040,976 | * | 6/1962 | De Mattos | 416/66 |
| 3,883,750 | * | 5/1975 | Uzzell, Jr. | 415/4.5 |
| 3,995,972 | * | 12/1976 | Nassar | 416/68 |
| 4,024,409 | * | 5/1977 | Payne | 416/81 |
| 4,170,738 | * | 10/1979 | Smith | 416/64 |
| 4,184,805 | * | 1/1980 | Arnold | 416/1 |
| 4,347,036 | * | 8/1982 | Arnold | 416/1 |
| 5,457,346 | * | 10/1995 | Blumberg et al. | 415/4.5 |

* cited by examiner

*Primary Examiner*—Christopher Verdier
(74) *Attorney, Agent, or Firm*—William H. Holt (57) ABSTRACT

Method and apparatus for converting the kinetic energy of a moving fluid stream into useful work by using a cascade of thin aero or hydro foils positioned therein. The foils may be provided with at least two degrees of freedom and adjacent foils move out of phase. The foils are subjected to fluid induced oscillations known as flutter. Barriers (3, 43) may be positioned upstream, above, or at sides of the apparatus for increasing efficiency by increasing the fluid velocity. A system of flywheels (17, 18) are used to increase inertia of the foils and are particularly useful with hydrofoils. A cascade of aero or hydro foils may be mechanically oscillated to transfer energy to a fluid.

9 Claims, 11 Drawing Sheets

EXTRACTION OF ENERGY FROM FLOWING FLUIDS

This application claims benefit of provisional application 60/026,981 filed Sep. 20, 1996.

BACKGROUND OF THE INVENTION

This invention comprises improvements to the methods and apparatus disclosed in my earlier U.S. Pat. No. 4,184,805 (January 1980) and U.S. Pat. No. 4,347,036 (August 1982) and, in general, is useful in Oscillating Cascade Power Systems (OCPS).

1. Field of the Invention

The present invention relates to techniques and apparatus for using the kinetic energy of a moving fluid stream and more particularly a cascade of aero- or hydro-foils oscillating in such a stream. These will produce useful work, e.g. generate electricity, by removing energy from the stream or produce propulsion by adding externally supplied energy to create a negative drag.

2. Description of the Prior Art

The continuing search for alternative sources of energy has caused a renewal of interest in utilizing the essentially inexhaustible kinetic energy of moving fluids such as wind, stream, river and ocean currents. These are derivative solar energy sources in that they are driven by solar heating. The windmill is a simple example of a device capable of harnessing such energy but is of limited utility because of the large centrifugal forces produced by large rotating blades, the dependence of the operating frequency on wind speed and the need for large areas of production, i.e. the circle made by the rotating blades, to produce sufficient power from naturally occurring wind flows.

One alternative to the windmill is disclosed in U.S. Pat. No. 4,024,409 to Peter R. Payne. This patent discloses a device including a wire which is oscillated by the shedding of vortices therefrom which oscillations are then converted into useful work. Like the aeolian harp, the Tacoma Narrows bridge and a street sign flapping in a gust of wind, this type of movement is induced when vortices are shed from a blunt body at a frequency in resonance with the natural frequency of the object. The patent also discloses the use of a single blade oscillated in response to wind conditions. However, as the windmill, the amount of energy which can be harnessed is limited. Furthermore, such oscillations are due to the Karman vortex street phenomena rather than the aeroelastic phenomenon of flutter.

U.S. Pat. No. 3,995,972 discloses a device including a stack of rigidly interconnected aerofoils positioned in a wind stream. By sequentially varying the angle of attack of the aerofoils, uniform oscillatory motion is produced for reciprocating a rod which then in turn drives an output device. The disadvantage of this system, like the windmill, is that there is no way to compensate for variations in wind speed to assure a substantially constant power output at a substantially uniform frequency.

Some work has also been done on the production of negative drag in the case of a single oscillating aerofoil, see I. E. Garrick, *Propulsion of a Flapping and Oscillating Airfoil,* NACA Rep. No. 567, May 1936.

It has long been known that a great amount of energy is available when an aerofoil is subjected to the phenomenon of aeroelastic flutter. While this phenomenon also applies to hydrofoils at sufficiently high water speeds, this was not observed in nature. Furthermore, studies of this phenomenon have been directed solely to preventing its occurrence because if left uncontrolled, it would lead to the eventual destruction of the aerofoil. My U.S. Pat. Nos. 4,347,036 and 4,184,805 addressed the useful application of this phenomenon for energy production and propulsion; these are extended here.

SUMMARY OF THE INVENTION

The present invention extends those disclosed in my earlier patents to improve their efficiency and applicability in naturally occurring fluid streams. It avoids the disadvantages of prior art by means of a novel method and apparatus for efficiently harnessing large amounts of the available energy from a moving fluid stream with a cascade of foils positioned therein. Except when specifically referring to a particular fluid, the term "aerofoil" as used below will include the concept of a hydrofoil as well with appropriately modified language, e.g. hydrosystem for aerosystem, etc. The term "aerofoil" is used in place of the more usual "airfoil" to emphasize this connection and to emphasize the use of such foils in energy generation rather than lift for aircraft.

Another aspect of the invention is the application of this novel method to a hydroenvironment. While flutter is not generally observed at naturally occurring water speeds, if the inertia of the system is increased by the use of flywheels attached to the generators or in between the hydrofoils and the generator system, flutter has been experimentally verified for hydrosystems.

According to one aspect of the invention, there is provided a novel method for converting the kinetic energy of an air flow into useful work by positioning a cascade of thin aerofoils in a moving stream to define an aerodynamic system. The aerofoils are at zero angle of attack when undisturbed and each aerofoil has two degrees of freedom with adjacent aerofoils moveable out of phase. The system is then adjusted until the speed of the fluid stream is a critical velocity for the system sufficient to induce flutter oscillations. The aerofoils are then disturbed and the resultant oscillations of the aerofoils are utilized to produce useful work. Variations in the fluid speed are detected and the system controlled to maintain critical velocity and steady state oscillations.

According to another aspect of the invention, there is provided apparatus for converting the kinetic energy of a fluid stream to useful work comprising a support structure open at opposite ends to permit fluid flow therethrough with a plurality of thin aerofoils and means for mounting these aerofoils within the support structure in a cascade and at zero angle of attack when undisturbed. In addition, the aerofoils are provided with at least two degrees of freedom with adjacent aerofoils moveable out of phase with each other. The support structure consists of a frame with barriers below and/or above and to the sides to channel flow through the structure, thereby increasing its speed and thus the efficiency of the system. The apparatus further includes means for utilizing the oscillatory movement of the aerofoils to produce useful work.

The aerofoils are preferably arranged in two subsystems of alternating foils, the aerofoils of each subsystem being interconnected to oscillate in phase. The subsystems may be interconnected to move 180 degrees out of phase or may be interconnected solely with oppositely acting mechanical oscillators which maintain and enhance the flutter oscillations and also provide the initial disturbance of the aerofoils within the fluid stream.

A control system may also be provided to maintain the flutter oscillations when the velocity of the fluid varies.

According to a further aspect of the invention, there is provided a method for converting the kinetic energy of the fluid stream into useful work by positioning a device including a pair of parallel plates and a thin aerofoil equally spaced from each plate and having at least two degrees of freedom within the fluid stream. The plates are positioned parallel to the free stream and the aerofoil is at zero angle of attack when undisturbed to define an aerodynamic system. The system is then adjusted until the velocity of the fluid is sufficient to induce flutter oscillations, the aerofoil is disturbed and the resultant oscillations are utilized to produce useful work.

According to a still further aspect of the invention, there is provided apparatus for converting the kinetic energy of a fluid stream into useful work comprising a support structure open at opposite ends to permit fluid flow therethrough and including a plurality of equally spaced flat plates extending parallel to the direction of fluid flow, a plurality of aerofoils within the support structure in a cascade with each aerofoil having at least two degrees of freedom and being equally spaced between adjacent flat plates at zero angle of attack when undisturbed, means interconnecting the aerofoils to oscillate in phase and means operatively associated with the aerofoils to utilize their oscillatory movement to produce useful work.

According to yet another aspect of the invention, there is provided either a single aerofoil in a bounded fluid or a cascade of aerofoils in a moving fluid stream. The aerofoils are mechanically oscillated to provide or increase the propulsive effect of the fluid. The mechanical driving means may be of any type including the output from a cascade of aerofoils subjected to flutter oscillations.

There has thus been outlined rather broadly the more important features of the invention in order that the detailed description thereof which follows may be better understood and in order that the present contribution to the art may be better appreciated. There are of course additional features of the invention which will be described hereinafter and which will form the subject of the claims appended hereto. Those skilled in the art will appreciate that this invention may be utilized as a basis for designing other structures or methods for carrying out the several purposes of this invention. It is therefore important that the claims of this invention be regarded as including such equivalent constructions and methods as do not depart from the scope of the invention.

BRIEF DESCRIPTION OF DRAWINGS

Several embodiments of the invention and its improvements have been chosen for purposes of illustration and description, as shown in the accompanying drawings forming a part of the specification, wherein.

DETAILED DESCRIPTION OF THE PREFERRED EMBODIMENTS

Figures 1A, 1B, 1C:
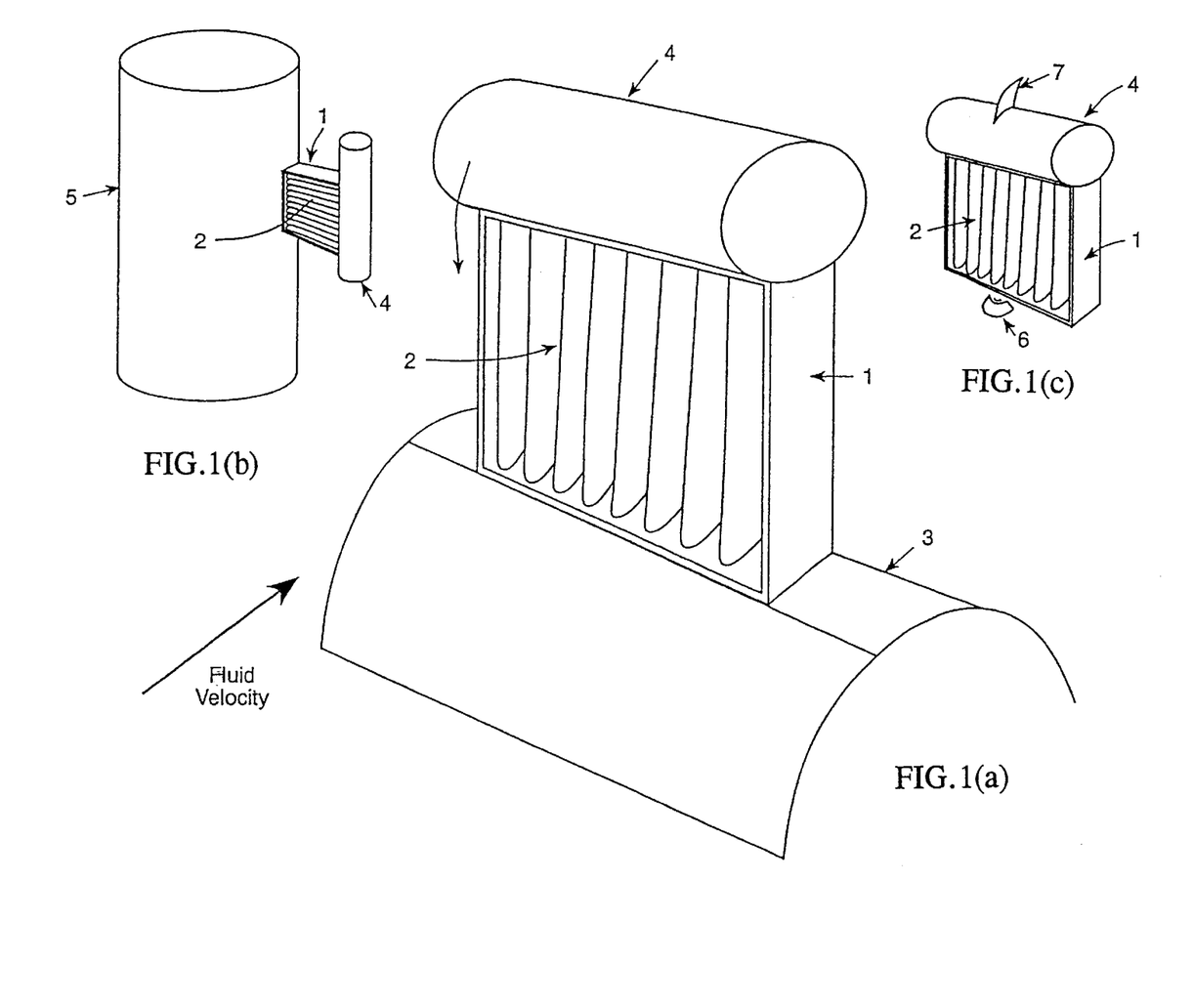
FIG. 1 is a perspective view of modules, either separated or attached, each including a cascade of foils, either vertical or horizontal, according to the original invention; a) represents a module mounted above a barrier, b) represents a module mounted to the side of a barrier and c) represents a module free to pivot to face the flow.

FIG. 1 shows a series, (a), (b), (c), of energy converters or systems (OCPS) comprised of frames 1 with either vertical or horizontal foils 2 in a variety of settings. FIG. 1 (a) represents a system mounted above a barrier 3 which is a circular or elliptical cylinder. A circular cylinder 4 mounted above the system contains the linkages, crankshafts and generators to protect them from the elements. FIG. 1(b) shows a system attached to the side of an existing structure, such as a silo or water tower 5. Again, a cylinder 4, in this illustration mounted to the side of the tower 5, houses the linkages, crankshafts and generators. Finally, FIG. 1(c) indicates a free-standing system mounted on a pivot 6 with a cylinder 4 on top to house the linkages, crankshafts and generators, with a fin 7 on top to direct the system to be transverse to the fluid flow. Each energy converter includes a plurality of equally spaced foils $2_1$, $2_2$, $2_3$, $2_4$, $2_5$, $2_6$, $2_7$, $2_8$ arranged within the support structure 1 at zero angle of attack when the foils are undisturbed. The extreme foils are spaced from the adjacent walls of the support structure by a distance equal to one half the distance between adjacent foils. As will be described below, the foils are mounted such that when they are disturbed under conditions which induce flutter oscillations, adjacent foils will oscillate substantially at 180 degrees out of phase and this oscillatory movement is utilized to produce useful work. Each foil is symmetric with a rounded leading and trailing edge and may be flat over the remainder of its breadth, has zero camber to reduce lift forces and is rectangular in plan form. While a cascade of eight foils are typically shown, it should be understood that the number of foils arranged in a cascade may vary depending on the intended use of the device. The foils may be stacked vertically or horizontally to form the cascade; they may be stacked in any direction as long as they are normally at zero angle of attack when undisturbed.

The present invention utilizes the phenomenon of self-excited feedback associated with the aeroelastic phenomenon commonly known as flutter. While this phenomenon is well recognized in air, it does have its counterpart in water where, due to the large difference in densities, the amount of energy available in naturally occurring water flows is much larger than that available in naturally occurring air flows. The following discussion will be worded for air flows but is applicable to water flows under certain restrictions to be discussed separately below.

This phenomenon involves the interaction of the elastic, inertia and dissipative forces of an aerofoil with the unsteady aerodynamic forces resulting from the movement of the aerofoil in a fluid stream. As the aerofoil oscillates in pitch (the angular rotation) and plunge (the translational movement), there results a complex generation of alternating vortices from the trailing edge which in turn form a trailing wake. The vorticity of the wake then feeds back to the aerofoil to introduce a force and movement having components of plus or minus 90 degrees out-of-phase with the aerofoil motion. This out-of-phase component introduces an apparent damping to the aerofoil. At a critical velocity ($V_c$) this aerodynamic damping component becomes negative and balances the positive mechanical damping of the oscillating aerofoil to provide harmonic oscillations of the aerofoil. At velocities above the critical velocity, increases in aerodynamic energy produce great instability and eventually the aerodynamic energy may become so great that the aerofoil is destroyed. Although much work has been done on the flutter phenomenon and the vast amounts of energy available during flutter has long been recognized, research has been overwhelmingly directed toward avoiding its disastrous consequences since during aircraft flight such flutter oscillations cannot be controlled but instead continue to build until the aircraft wing is eventually destroyed. The present invention however is able to utilize the flutter phenomenon because there is provided a control system which prevents the instability and destruction normally associated with wing flutter situations. This allows the utilization of such phenomena to generate energy in a controlled manner.

The use of a cascade provides a distinct advantage over a single aerofoil subjected to flutter. It can be shown that for a given set of parameters, the critical velocity needed to oscillate a cascade is less than that for a single aerofoil. Furthermore, when the aerofoils are arranged so that adjacent aerofoils oscillate 180 degrees out of phase with each other, the critical velocity for a particular set of parameters will be the lowest possible.

However, two important factors must be recognized. In order to generate electrical energy economically from naturally occurring wind currents, either the cross-sectional area exposed to the fluid flow must be large (the windmill solution) or the velocity of the fluid must be increased, i.e. the barrier solution as disclosed herein. By presenting a barrier to the natural flow and thus causing the fluid to pass the same amount of mass through a smaller area, the fluid velocity must be increased. As the available energy is proportional to the cube of the fluid velocity, the use of barriers is quite efficient. When water flows are concerned, the velocities at which flutter will occur are generally not found naturally. However, when the effective mass of the system is increased, e.g. by attaching flywheels to the rotating shafts by means of which the power is transferred from the translational and rotational motion of the hydrofoils to an electric generator, the critical velocities required for flutter are reduced to values which are naturally available in rivers, streams and ocean currents around the world. These two improvements form the basis of the present invention.

Figure 2:
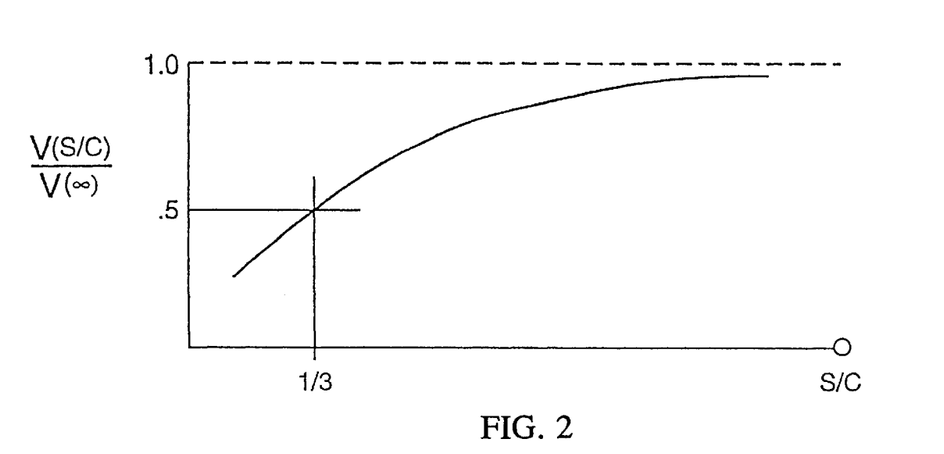
FIG. 2 is a graph illustrating that, for a given set of parameters, the critical velocity needed to induce flutter oscillations is less for a cascade of foils than for a single foil.
Figure 4:
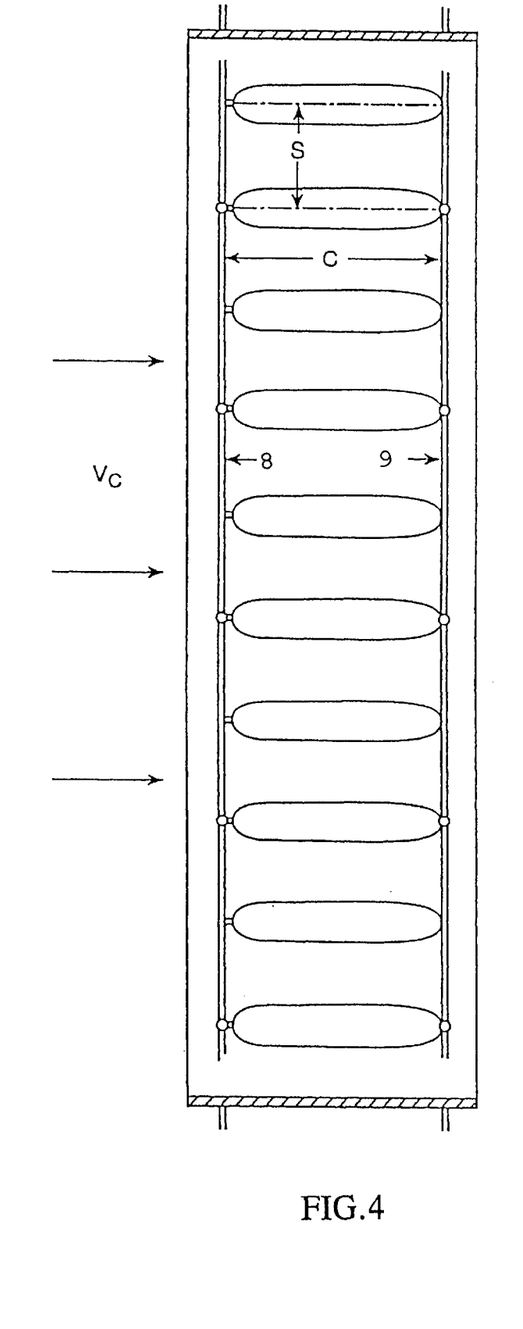
FIGS. 4 and 5 are section views of FIG. 1 illustrating the position of the foils subjected to a critical velocity before and after being disturbed; the foils may either be aerodynamically shaped or even flat plates with rounded leading and trailing edges.

FIG. 2 is a graph illustrating the advantage of the cascade. The parameter S/C, which is the abscissa in this figure, defines the spacing of foils arranged in a cascade where S is the distance between adjacent foils and C is the chord as shown in FIG. 4. The ordinate is a non-dimensional ratio of the critical velocity for a cascade V(S/C) where adjacent foils oscillate at 180 degrees out of phase, to the critical velocity for a single foil, $V_\infty$. For a particular set of parameters, it can be seen that where S/C is about 1/3, the critical velocity for a cascade is about 1/2 that needed to produce flutter for the case of a single foil. Accordingly by using a cascade for the removal of energy due to flutter excitation from the fluid flow, flutter can be achieved at much lower fluid velocities than for a single foil. In fact by controlling the parameters as will be explained hereinafter, the critical velocity in air needed to induce harmonic oscillations can be as low as 1 mile-per-hour (1 m.p.h.). This also holds for flutter in water if additional inertia is added to the system as discussed below.

Figure 3:
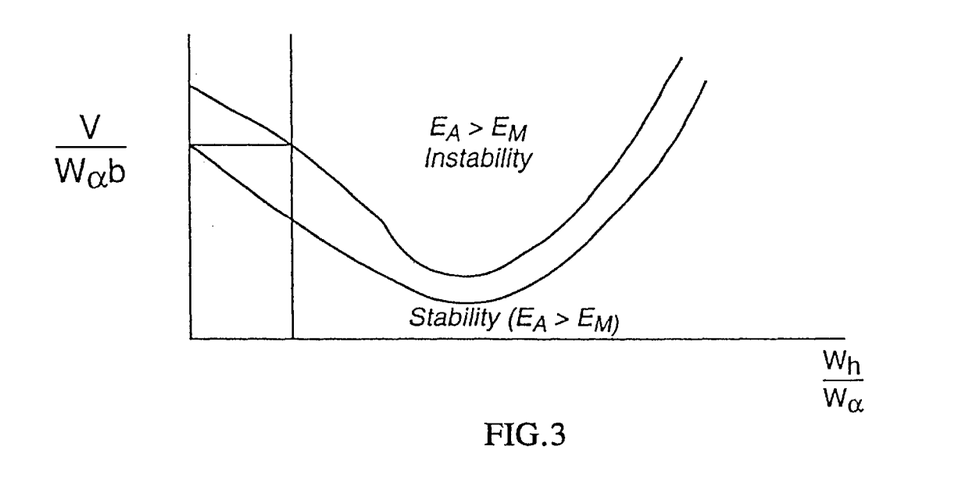
FIG. 3 is a graph illustrating how energy can be recovered by introducing a utility device into a system subject to flutter oscillations.

FIG. 3 is a graph illustrating the advantages of incorporating a utility device such as an electric network into an oscillating cascade. The ordinate is a non-dimensional flutter speed, $V/W_\alpha b)$, where V is the fluid velocity, $W_\alpha$ is the natural frequency associated with pure pitch when V is zero and b is the aerofoil semi-chord. The abscissa is the ratio of $W_h$ to $W_\alpha$ where $W_h$ is the natural frequency associated with pure plunge when V is zero. The region below each curve defines the domain where the aerodynamic energy, $E_A$ is less than the mechanical energy, $E_M$. For a given set of values of $W_h$ and $W_\alpha$, the critical velocity $V_c$ can be derived. Above each curve, which represent the critical velocity $V_c$, $E_A$ is greater than $E_M$, and accordingly represents a region of instability. The lower curve represents the critical velocity for a single aerofoil while the upper curve represents the critical velocity where a utility device is incorporated into the system. This graph then illustrates that by adding a utility device, the aerodynamic energy which would otherwise cause the system to enter the unstable region is instead absorbed by the utility device while the system remains in the stable region. For a cascade, since the critical velocity is lower than for a particular set of parameters, the associated curves will be lower than those shown in FIG. 3 for a single foil.

Figure 5:
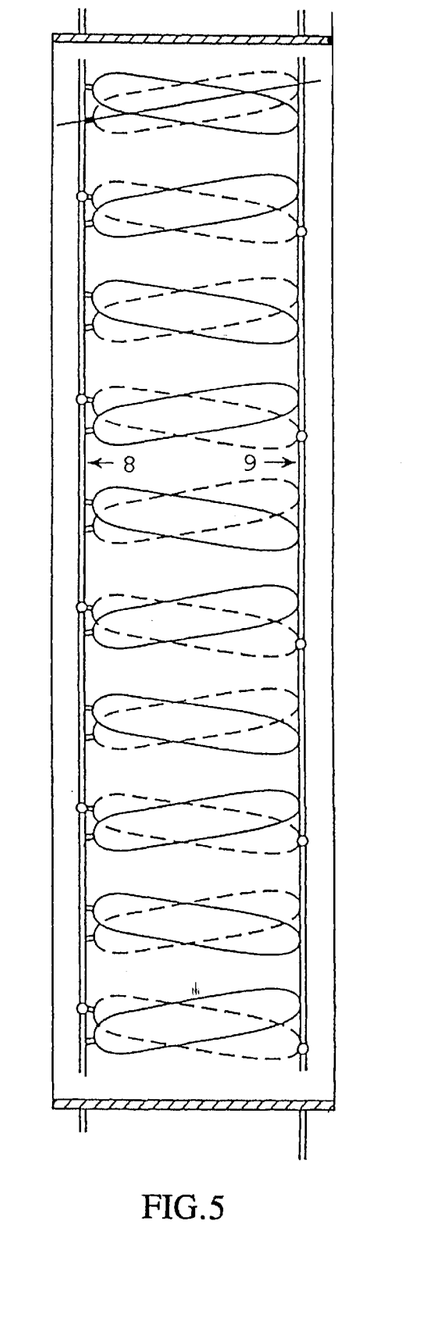
Figure 6:
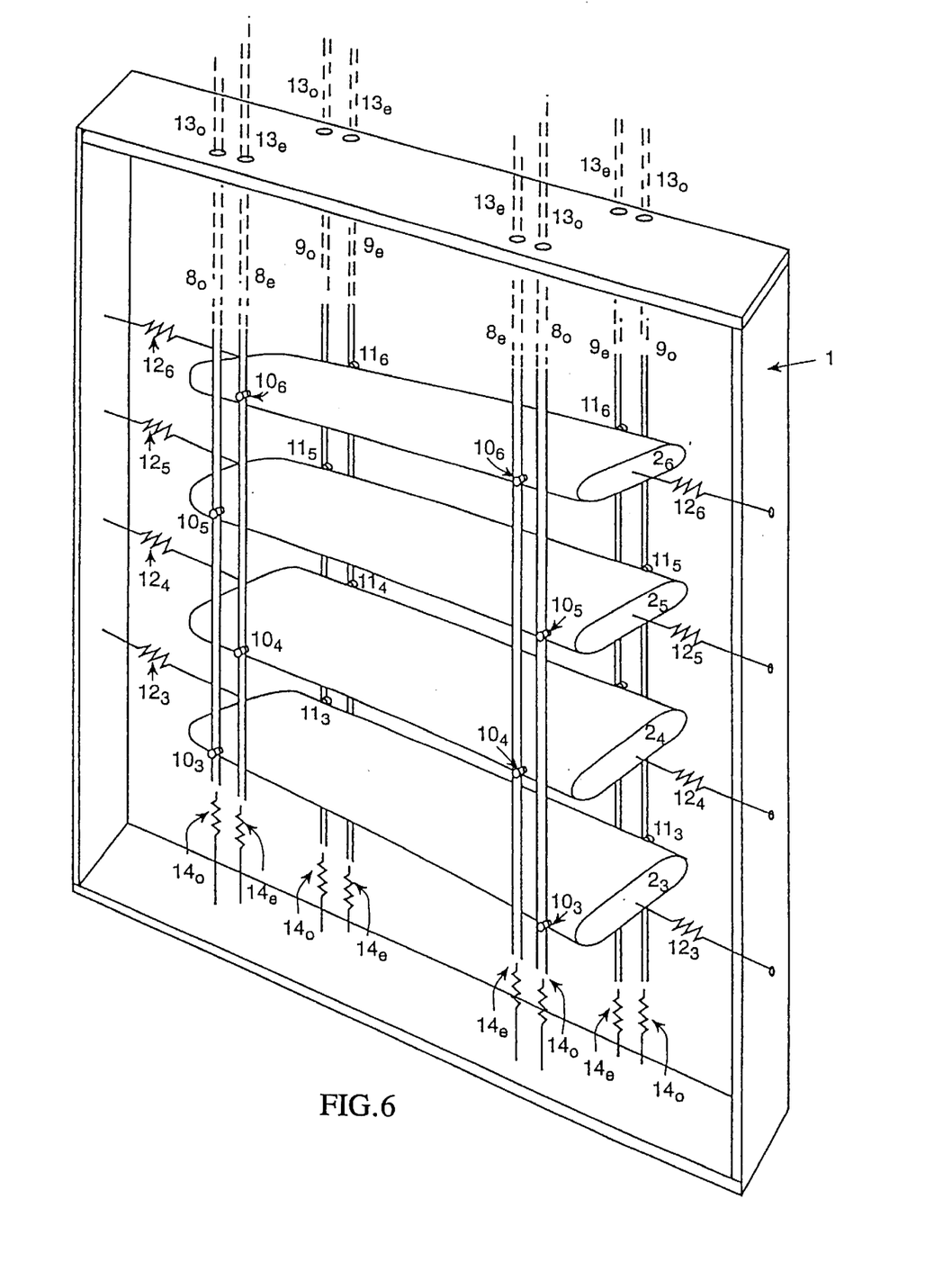
FIG. 6 is a partial schematic perspective view of a system module with horizontal foils illustrating the mounting of the foils according to the first embodiment and indicating the alternating linkage connections to both the leading and trailing edges of the foils.

FIGS. 4 and 5 illustrate the harmonic oscillations which result when a cascade of aerofoils, in this illustration ten are shown, is subjected to fluid flow at the critical velocity $V_c$, i.e. at flutter. These are top views for vertical foils (or side views for horizontal foils) which in these illustrations are shown to have a typical symmetric airfoil cross-section. As mentioned above, the term "aerofoil" is used for the foils used here for air flows and where the term "hydrofoil" would be used for water flows. Both or either are represented by the term "foil". The cross-sections of these foils need only be symmetric and could, as illustrated in other figures, be flat plates with rounded leading and trailing edges. The term "airfoil" will be used for the typical cross-sections used in aircraft. In FIG. 4 the aerofoils are at zero angle of attack prior to being disturbed. Even though the wind velocity is at the critical level, there is no movement of the foils due to their symmetric contour. However, as soon as the system is disturbed by moving at least one of the foils, the flow field has the effect of coupling adjacent foils to begin to oscillate approximately 180 degrees out of phase as shown schematically in FIG. 5. Alternating foils are connected by rods or cables, $8_e$ and $8_o$ at the even and odd leading foil edges and $9_e$ and $9_o$ at the even and odd trailing edges respectively. (The upper rod or cable hides the lower one in these views). As is best shown in FIG. 6, these rods or cables 8 and 9 are attached to the foils by pins, $10_1$, $10_2$, etc., on the front and rear faces of the foils. The oscillatory movement, which occurs at critical velocity, was first observed during studies of the adverse effects of flutter on rotating compressor blades.

In FIG. 6, there is shown a first embodiment for mounting the aerofoils, of which only four are shown for convenience labeled as $2_3$, $2_4$, $2_5$, $2_6$, of the present invention within the support structure, generally indicated by the numeral 1, in order to facilitate understanding of the invention although all of the foils are implicitly referred to hereinafter. These foils are shown in a horizontal position, but could just as readily be mounted in a vertical position. As shown in FIG. 6, the foils are arranged in two subsystems, the odd numbered foils $2_3$, $2_5$, and the even numbered foils $2_4$, $2_6$. The complete system will consist of all of the foils. The foils of each subsystem are interconnected to move in phase while each foil has at least two degrees of freedom because at least two degrees of freedom are required to induce flutter oscillations. The foils are attached at both ends to the frame by supporting springs 12, labeled for convenience as $12_3$ for both ends of foil $2_3$, etc. For vertical foils, the lower spring may be replaced by a drag line since it is not needed for support. Pairs of rods or cables, $8_e$ and $8_o$, are attached to pins, $10_4$ and $10_3$, one each at or near the two ends of the front face of foils $2_4$ and $2_3$, etc. with similar rods or cables and pins, $9_e$ and $9_o$, attached to pins $11_4$ and $11_3$, on the rear faces. The rods or cables extend beyond the frame through holes $13_e$ and $13_o$, which are sufficiently large to avoid binding, to connect to the generating apparatus (not shown). If rods are used of sufficient stiffness to transfer compressional as well as tensile forces, no other support is required but if flexible cables, which will transfer tension but not compression, are used to transfer the motion of the foils to the linkages used in the generation system, they will be pre-stressed by using additional springs, $14_e$ and $14_o$, connecting the cables to the frame. Stops, not shown for clarity of the remainder of the figure, are also provided to limit the amount of movement within the system.

From the foregoing, it will be apparent that the two subsystems are free to oscillate in pitch and plunge relative to each other and that when the entire device is subjected to fluid flows at a critical velocity, adjacent foils will oscillate at approximately 180 degrees out of phase as shown in FIG. 5. Thus the critical fluid velocity will be the lowest possible for a particular set of parameters.

Since it is necessary to disturb the foils in order to achieve the desired harmonic oscillations, at least one mechanical oscillator is provided for one of the subsystems. This could be provided directly to the subsystems or applied to the electro-mechanical generating system (not shown here) to which the rods or cables of the subsystems are attached. In addition to providing the initial disturbance, operation of these oscillators maintains and enhances the oscillatory movement. Thus if the flow speed should die down to a value which is too low for the control system, described below, to maintain the system at critical velocity, the mechanical oscillators will keep the foils oscillating until the fluid velocity increases sufficiently to reestablish flow at critical velocity. With the present invention, the natural velocity of the fluid is used as the critical velocity. Accordingly, in order for this velocity to induce flutter oscillations, one or more of the parameters of the system, which includes the generating system, must be varied. Furthermore, because the fluid velocity may vary with time, these parameters must be varied in response to changes in the fluid velocity such that the prevailing velocity will maintain the oscillations. To vary the parameters of the system, there is provided a control system which includes a detector (not shown), such as an anemometer for wind speeds, for detecting the fluid velocity or one which detects the amplitudes of the oscillations. A signal from this detector provides feed back into the system to vary at least one parameter thereof. Since the critical velocity depends on the rigidity of the foils and the location of their center of gravity, these parameters can be varied, for example, by varying the effective spring stiffness, or effective center of mass, by varying the impedances of the generators separately attached to the leading edge and trailing edge of each subsystem, i.e., each subsystem of even and odd aerofoils itself is composed of two "sub"-subsystems comprised of the leading edge and the trailing edge rods or cables and the remainder of the overall energy converter system to which these are connected.

While, in the foregoing, the parameters associated with the energy converter are controlled, it is also within the scope of the invention to control fluctuations in the fluid velocity so that a constant velocity is continuously applied to the foils.

Figure 7:
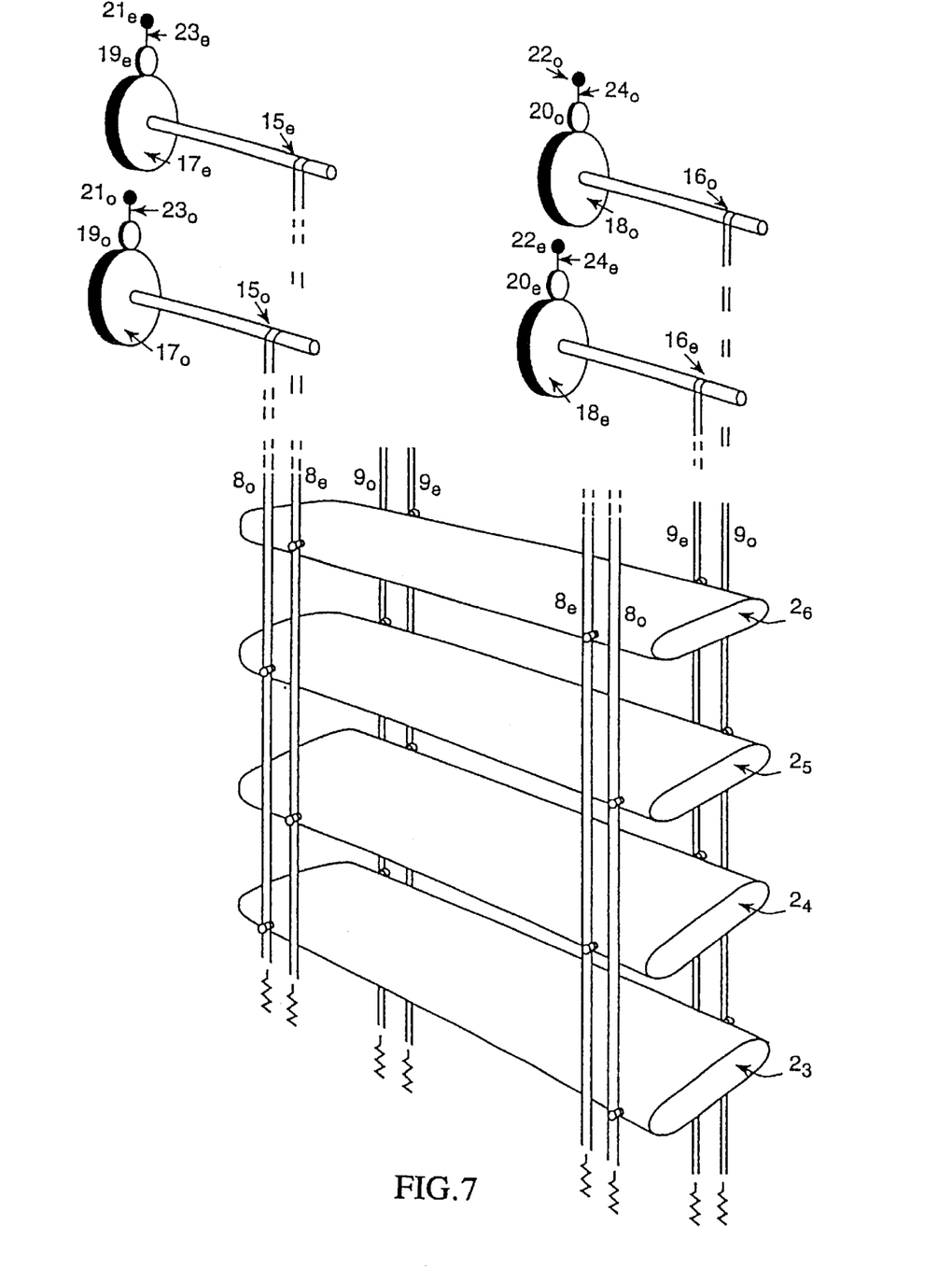
FIG. 7 is a partial schematic representation of a system of foils connected to flywheels through either a pre-stressed cable wrapped around the shaft of the flywheels or by means of thin bars with a straight ratchet attached to a gear on the shaft of the flywheels; the frame is removed to better illustrate the design.

FIG. 7 illustrates one method of adding inertia to the system by means of flywheels. Using the same numbering as in the previous figures, coupling rods or cables $8_e$, $8_o$, $9_e$ and $9_o$ are connected to shafts $15_e$, $15_o$, $16_e$ and $16_o$ for the leading edge and trailing edge "sub"-subsystems respectively. The connection is by gears for rigid coupling rods and by a chain and sprocket for the flexible cable, which is pre-stressed to allow transfer of both tensile and compressive forces. These shafts are then connected to heavy flywheels, $17_e$, $17_o$, $18_e$ and $18_o$ which rotate at the same frequency as the movement of the subsystems. These large flywheels are then connected by gears to a set of smaller flywheels, $19_e$, $19_o$, $20_e$ and $20_o$ which, by virtue of the difference in radii, will rotate at a multiple of the subsystem frequency. Attached to the small flywheels are additional masses, $21_e$, $21_o$, $22_e$ and $22_o$, extended on arms, $23_e$, $23_o$, $24_e$ and $24_o$, which add more inertia to the subsystems and whose position along the arm may be controlled to alter the effective inertia of the subsystems. The supporting frame and other, if any, foils, are not shown to emphasize the connections and flywheels.

Figure 8:
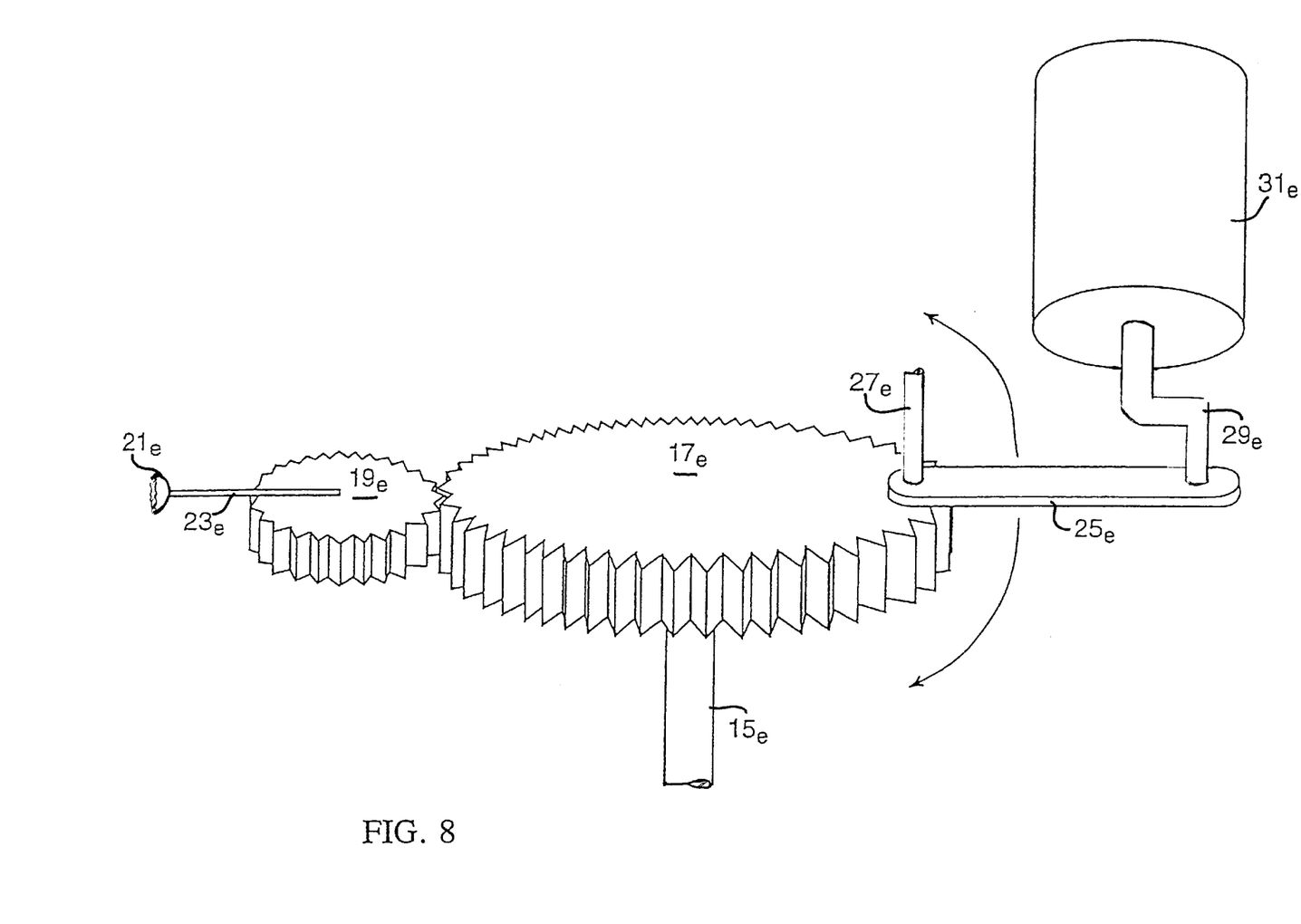
FIG. 8 is a partial schematic representation of the flywheels and attached mass on an arm to provide an increased effective inertia to the leading and trailing edges of each paired set of foils which are attached to the supporting flywheel shaft; a bar connects the top of the large flywheel to a crankshaft which turns a generator.

FIG. 8 shows further detail of the flywheel and mass combination, described above in FIG. 7, for the leading edge "even" foil "sub"-subsystem. A shaft, $15_e$, drives a large flywheel $17_e$ which in turn is geared to drive a small flywheel $19_e$, with a mass $21_e$ on an arm $23e$. The large flywheel in this embodiment is also connected to a linkage $25_e$ by means of a pin $27_e$. The linking arm in turn causes a crankshaft, $29_e$ to rotate and drive an electric generator $31_e$. This combination is repeated for the leading edge odd foil "sub"-subsystem, the trailing edge even "sub"-subsystem and the trailing edge odd "sub"-subsystem.

Figure 9:
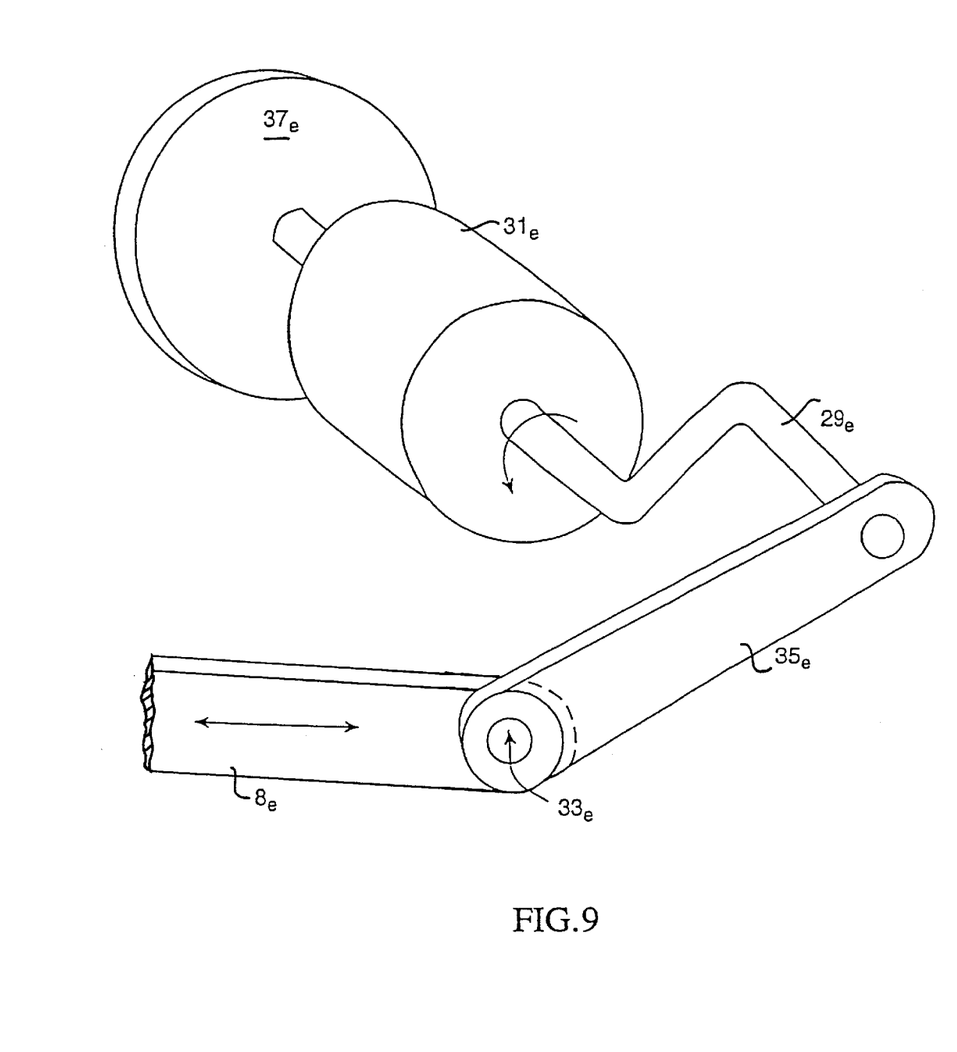
FIG. 9 is a partial schematic representation of a typical linkage connecting the even/odd pairs of leading/trailing edge foils to a generator; followed by a heavy flywheel.

FIG. 9 illustrates an alternative method of adding inertia to the subsystems. The linkage, in this case a rigid rod $8_e$ coming from the "even" leading edge foils, is attached by means of a pin $33_e$ to a second rod $35_e$ which turns a crankshaft $29_e$ which in turn rotates a generator $31_e$ with a flywheel $37_e$ on the same crankshaft. In this figure, the flywheel is placed behind the generator for clarity; it will typically be placed before the generator.

Figures 10, 11:
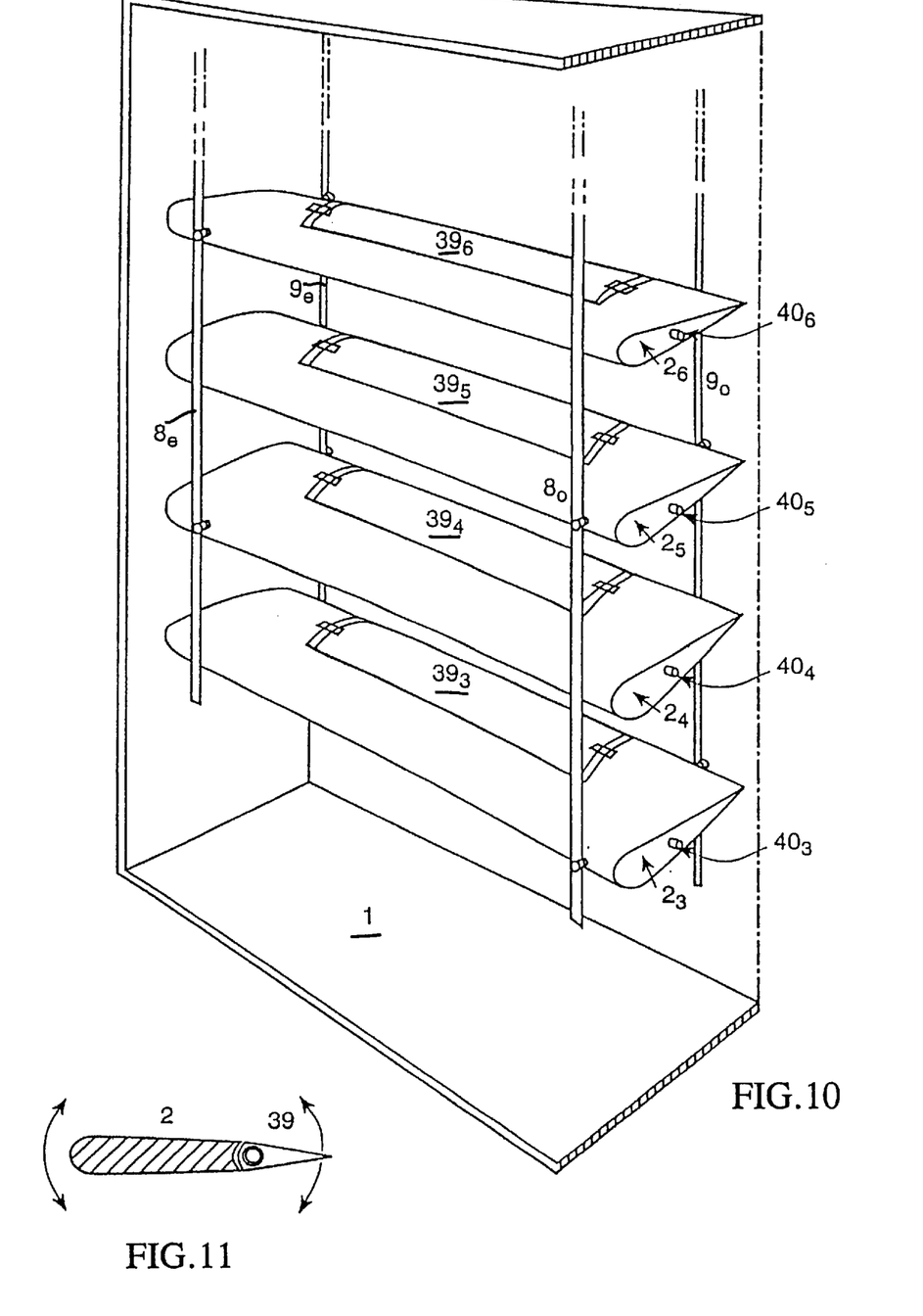
FIG. 10 is a partial schematic perspective view illustrating yet another embodiment of the invention where an aerodynamic foil is used with an aileron.
FIG. 11 is a section view illustrating a foil according to the embodiment of FIG. 10.

A further embodiment of the OCPS with similar reference numerals designating similar elements is shown in FIG. 10. While in the previous embodiments, the foils are freely moveable in pitch and plunge, in this embodiment the foils are free only to move in pitch while separate flaps, $39_1$, $39_2$, $39_3$, etc. are pivotally connected to the respective foils, $2_1$, $2_2$, $2_3$, etc. to provide the second degree of freedom. Each foil is provided with pins, $40_1$, $40_2$, $40_3$, at the near end and $41_1$, $41_2$, $41_3$, at the far end to mount the foils to the support structure, 1. These pins allow pitching movement and also support the foils to prevent plunging movement. While the flaps are spring biased to assure the position shown in the figure when at rest, they may be moved due to the fluid dynamic forces of the fluid stream as the foils oscillate in pitch. A set of rods, $8_e$ and $8_o$, and $9_e$ and $9_o$, attached to the leading and trailing, even and odd foils respectively, interconnect the subsystems. Only a representative set of foils is shown in this figure for clarity. FIG. 11 shows a section of the foils.

Figure 12:
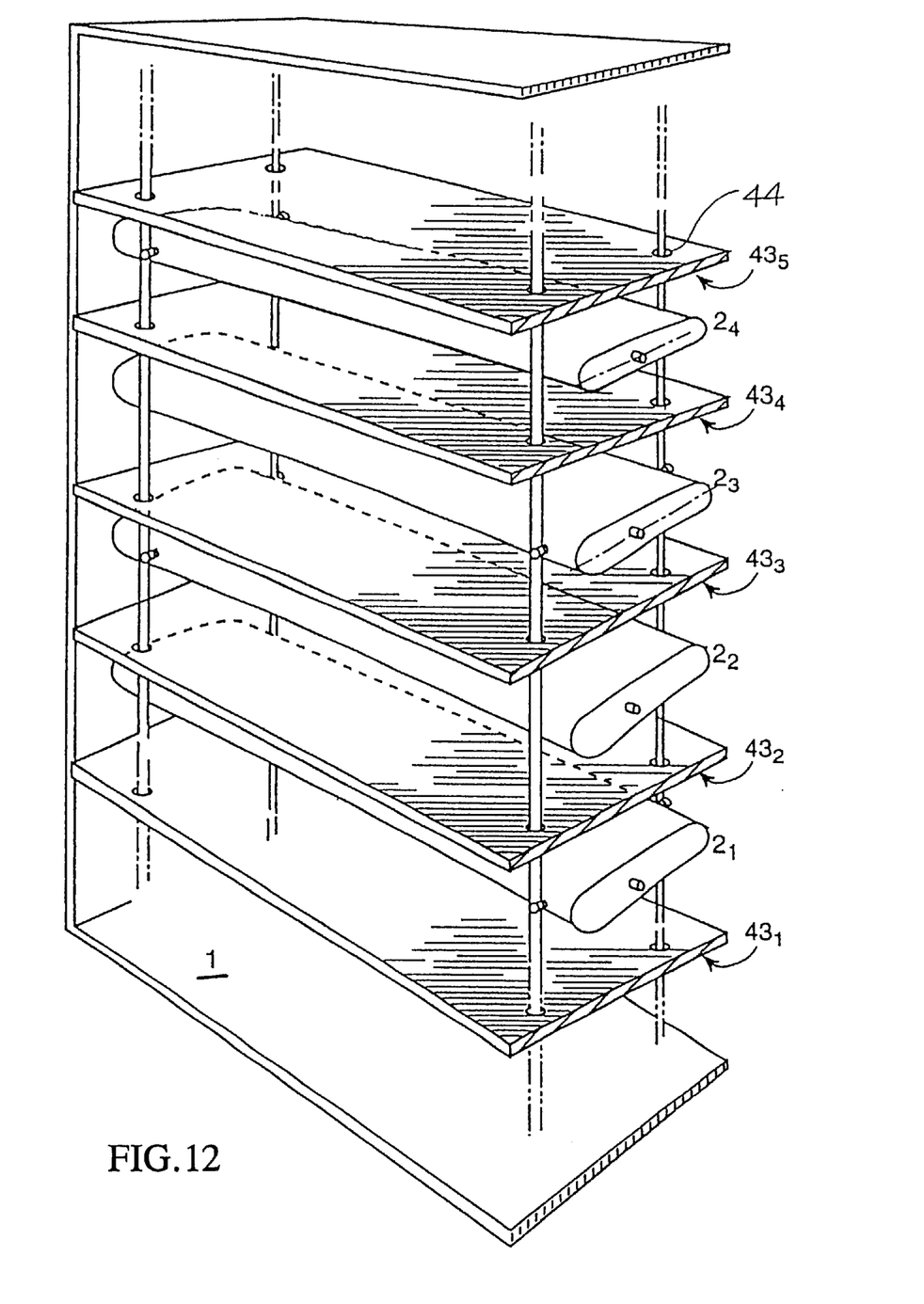
FIG. 12 is a partial schematic perspective view illustrating another embodiment of the invention.

FIG. 12 illustrates yet another embodiment of the invention with similar reference numerals for similar elements. In the foregoing embodiments, the OCPS has included two subsystems of foils which move substantially 180 degrees out of phase. It can be shown that a single foil which is equally spaced between a pair of flat plates when in its undisturbed state acts as an infinite cascade since two subsystems oscillating 180 degrees out of phase with adjacent foils spaced a distance s apart will have an undisturbed flow at s/2 by symmetry. This same type of flow results if, instead of a cascade of foils, a flat plate is positioned at s/2 above and below the foil. This will be apparent from the following.

In the case of two subsystems oscillating 180 degrees out of phase with adjacent foils spaced apart by a distance s, the fluid is undisturbed at s/2, i.e., halfway between adjacent foils. The same type of flow results if, instead of a cascade of foils, a flat plate is positioned at s/2 both above and below a single foil. Thus in FIG. 12, there is provided a cascade of foils spaced from the supporting frame by s/2 from either end with foils themselves spaced at a distance s apart. The foils, pins, rods or cables, frame, etc. are as described above with the same numbering system. However, thin flat plates, $43_1$, $43_2$, $43_3$, etc., are introduced halfway between the foils (at rest), i.e., at s/2, with openings 44 in the plates to allow the rods or cables to pass through without binding.

It will be apparent that each bounded foil acts as an infinite cascade, i.e., has the lowest possible critical velocity for a particular set of parameters. In addition, since each subsystem is connected by rods, the energy absorbed by each foil in each subsystem may be applied to a single utility device which could consist of two generator systems, one for the leading edges and the other for the trailing edges to provide a method of controlling the motions by altering the respective impedances of the generator systems.

Similarly, it will be appreciated that all of the foregoing embodiments may be constructed to permit three or more degrees of freedom since the invention is not intended to be limited to only two degrees of freedom. For example, flaps may be provided in combination with foils which are freely moveable in both pitch and plunge to provide an OCPS having three degrees of freedom.

In operation, the OCPS is positioned at a location where it will be subject to a fluid flow. Thereafter, based on the velocity of the fluid, various parameters are adjusted so that the fluid velocity will be a critical velocity for the system. Then at least one foil is disturbed to initiate harmonic oscillations and the utility device harnesses the energy from the fluid flow and converts it into useful work such as the production of electrical energy or a pumping action. Because a control system as provided, variations in the fluid velocity will be detected and the system will be automatically adjusted so that the prevailing velocity continues to cause harmonic oscillations due to flutter.

Figure 13:
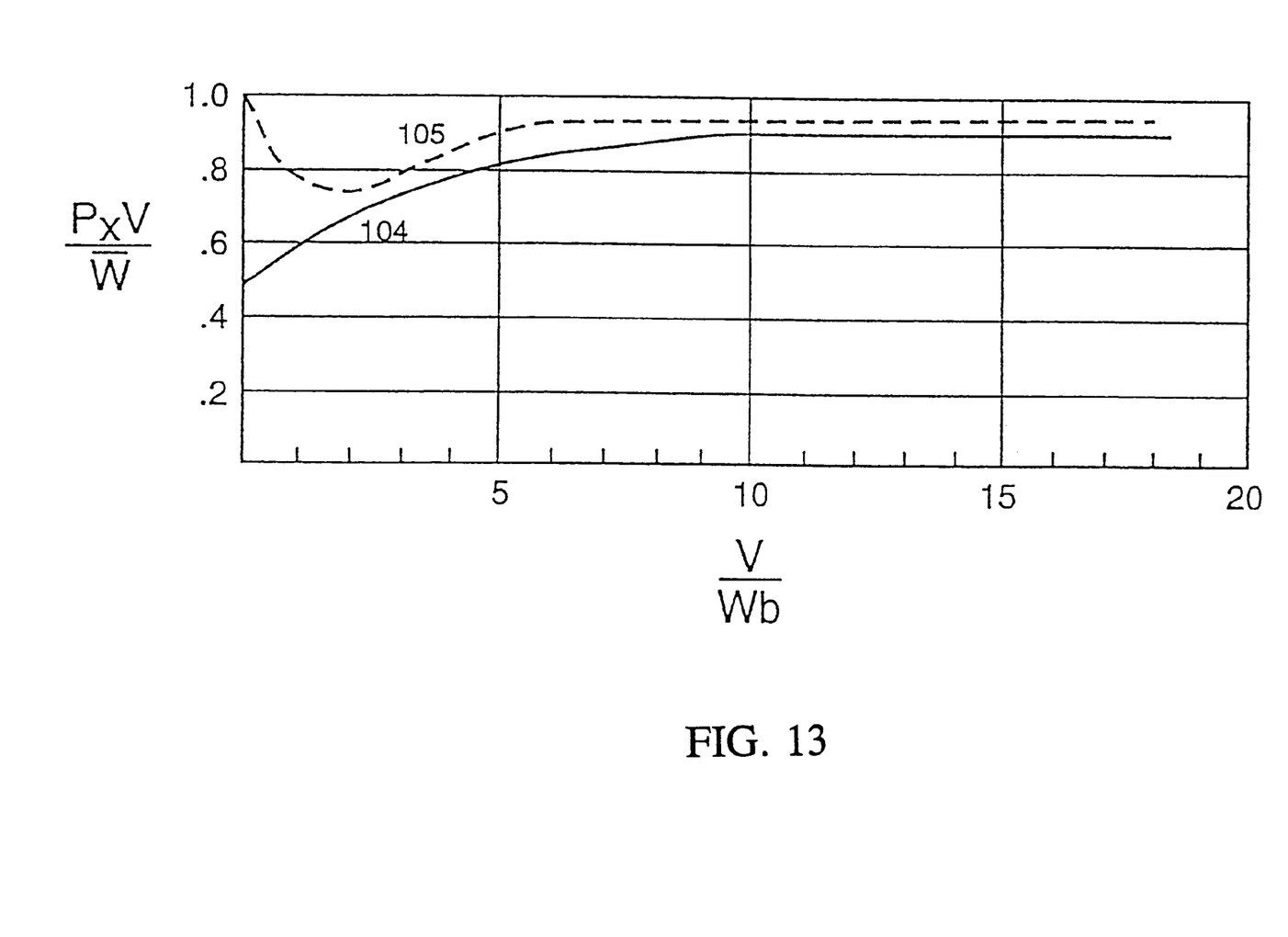
FIG. 13 is a graph illustrating the increased efficiency achieved by oscillating a cascade of foils in a moving fluid stream to provide propulsion.

Thus far the invention has been disclosed as including a cascade of foils driven solely by a moving fluid flow to do useful work. However, the cascade can also be mechanically oscillated so that the propulsion of a moving fluid stream of velocity V is increased. In 1936, I. E. Garrick reported that, by oscillating a single airfoil in a moving flow of air, a negative drag is produced. FIG. 13 is a graph illustrating this phenomenon. The ordinate is the ratio of the average work done per unit time, ($P_x$ V), to the average work done per unit time, W, to maintain the oscillations against the aerodynamic forces and pitching moment. The abscissa is a non-dimensional relationship, V/(W b), where W is the frequency of oscillation in pure plunge and b is the semi-chord. Curve 104 represents Garrick's findings for a single airfoil in pure plunge where S/C is infinite. The case of a cascade where S/C is 1/3 is represented by curve 105. By way of example, assume that V=10 ft./sec, b=1/2 ft., W=40 rad./sec so that V/(W b)=1/2. From FIG. 13 it will be seen that for a single foil (S/C=∞), ($P_x$ V)/W=0.53 while for the cascade (S/C=1/3), ($P_x$ V)/W=0.9. Thus by oscillating a cascade in a moving fluid stream the efficiency of the propulsive energy derived will be about 1.7 times that for a single foil. Similar increases in efficiency can be achieved where the cascade is oscillated in pure pitch, a combination of pitch and plunge, or where flaps are provided either alone or in combination with pitch and/or plunge. Since the cascade is here being used only to assist in the propulsion of the fluid in which the cascade is positioned, flutter and critical velocity are not important factors.

Figure 14:
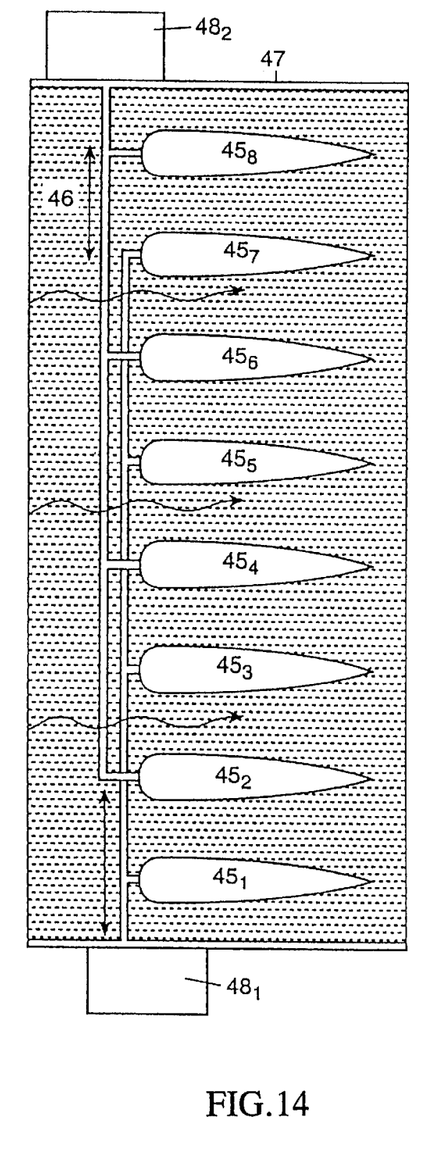
FIG. 14 is a schematic sectional view of one embodiment of a propulsive device according to the present invention.
Figure 15:
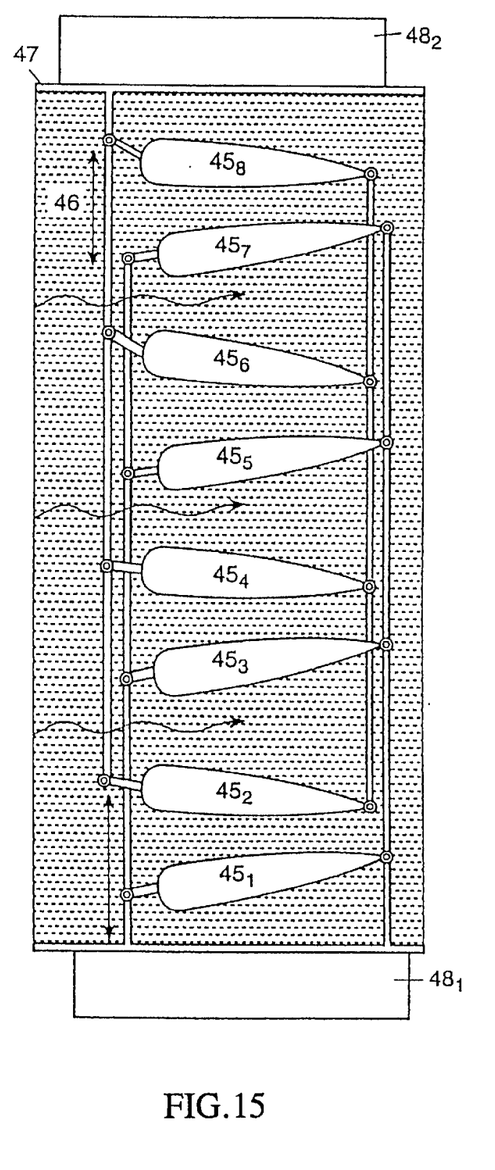
FIG. 15 is schematic sectional view of another embodiment of a propulsive device.

FIGS. 14 and 15 illustrate embodiments of this invention for increasing the propulsion of a moving stream. FIG. 14 shows a cascade of foils, $45_1$, $45_2$, $45_3$, etc., arranged to define two subsystems (even and odd) within a fluid stream 46 which is being pumped through a conduit 47. The subsystems are oscillated 180 degrees out of phase by two mechanical driving sources $48_1$, $48_2$, in pure plunge. The driving sources may be of any type, including some other OCPS. It is thus within the scope of the invention to use a fluid driven cascade at flutter to produce mechanical movement for oscillating the foils. In such a construction, a first cascade is provided in a first fluid stream maintained at critical velocity and used to oscillate a second cascade to thereby increase the propulsion of the second stream.

FIG. 15 illustrates another embodiment of a device for increasing propulsion of a moving stream. As in the previous figure, the fluid stream 46 is pumped through a conduit 47 and the foils are arranged in two subsystems, each responsive to one of the two mechanical driving system sources $48_1$, $48_2$, operating 180 degrees out of phase. In this embodiment, each subsystem is oscillated in both pitch and plunge.

Since as stated above, a single foil equidistant from the opposite walls of a bounded fluid acts as an infinite cascade, a single foil can be oscillated in a bounded fluid to increase propulsion. While the cascade of foils described in FIGS. 14 and 15 are shown positioned in a bounded fluid, it is also within the scope of this invention to utilize such a cascade in a naturally flowing unbounded fluid stream, for example a river or a wind current.

Having thus described the invention and its improvements with particular reference to the preferred forms thereof, it will be obvious to those skilled in the art to which the invention pertains, after understanding the invention, that various changes and modifications may be made therein without departing from the original scope of the invention as defined by the claims appended hereto.

What is claimed is:

1. A method of converting kinetic energy of a fluid stream into useful work, said method comprising the steps of locating an array of foils within said fluid stream, mounting said foils to have at least two degrees of freedom, and causing said stream of fluid to move across said foils for causing said foils to undergo flutter oscillations, the improvement comprising the step of adding inertia to said array of foils for stabilizing and maintaining said flutter oscillations.

2. A method as defined in claim 1 wherein said step of adding inertia to said array of foils comprises the step of adding flywheel means for minimizing variation of said flutter oscillations.

3. A method as defined in claims 1 including the step of diverting additional fluid across said foils for increasing the velocity and mass of said stream of fluid acting upon said foils.

4. A method as defined in claim 3 wherein the step of diverting additional fluid is caused by locating a flow diverting barrier in said fluid stream at a location upstream of and adjacent to said foils.

5. An apparatus for converting kinetic energy of a fluid stream into useful work, said apparatus including an array of foils, means mounting said foils for having at least two degrees of freedom, means for allowing a stream of fluid to move across said foils for causing said foils to undergo flutter oscillations, the improvement comprising means connected to said array of foils for adding inertia to said foils for maintaining and stabilizing said flutter oscillations.

6. Apparatus as defined in claim 5 wherein said means for adding inertia to said array of foils comprises flywheel means connected to said foils for minimizing variations of said flutter oscillations.

7. Apparatus as defined in claim 6 including barrier means located upstream of said foils for increasing the volume and velocity of said stream of fluid past said foils.

8. Apparatus as defined in claim 7 wherein said flywheel means is comprised of a train of meshed gear members connected to said foils, and means wherein said gear members are caused to rotate by oscillation of said foils during flutter thereof.

9. Apparatus as defined in claim 5 including barrier means located upstream of said foils for increasing the volume and velocity of said stream of fluid past said foils.

* * * * *